Figure 1:
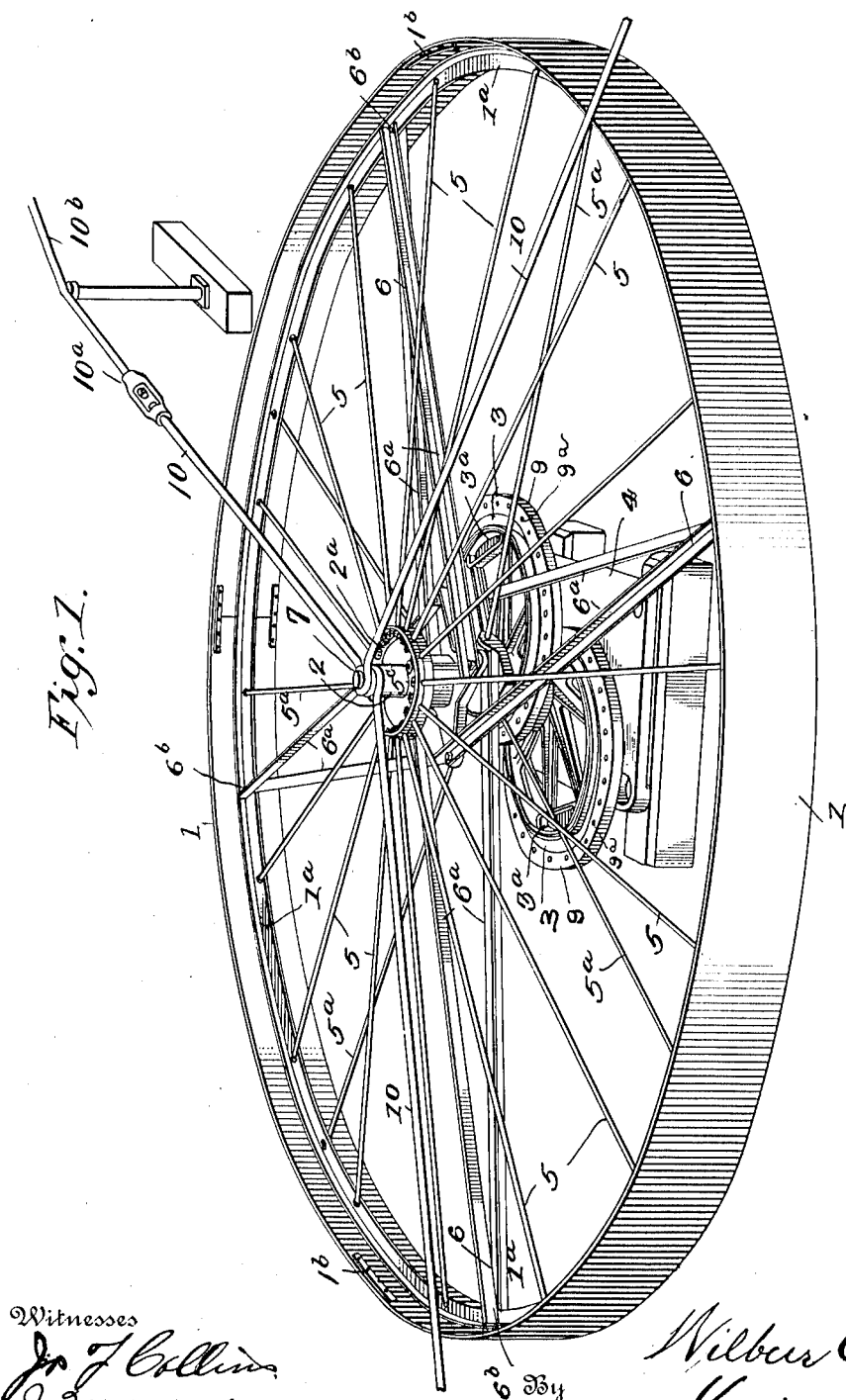

W. O. PLATT.
HORIZONTAL POWER TRANSMISSION WHEEL.
APPLICATION FILED APR. 18, 1911.

1,072,028.

Patented Sept. 2, 1913.
4 SHEETS—SHEET 1.

Witnesses
J. J. Collins
J. M. Wynkoop

Inventor,
Wilbur O. Platt,
Knight Bros
Attorneys

W. O. PLATT.
HORIZONTAL POWER TRANSMISSION WHEEL.
APPLICATION FILED APR. 18, 1911.

1,072,028.

Patented Sept. 2, 1913.

W. O. PLATT.
HORIZONTAL POWER TRANSMISSION WHEEL.
APPLICATION FILED APR. 18, 1911.
1,072,028.
Patented Sept. 2, 1913.
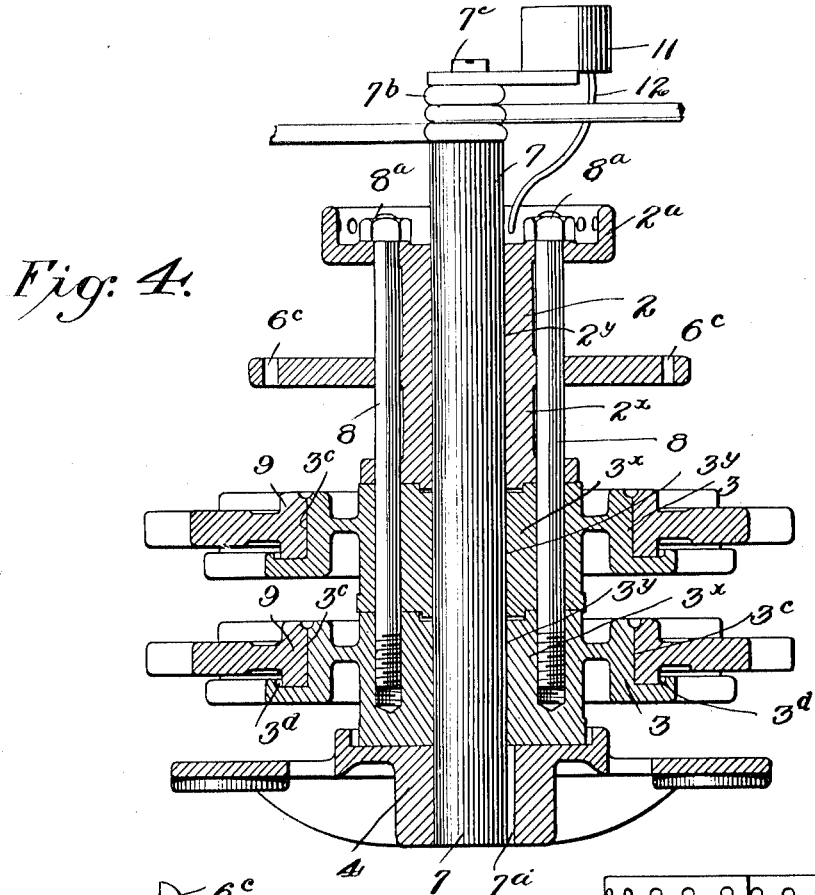
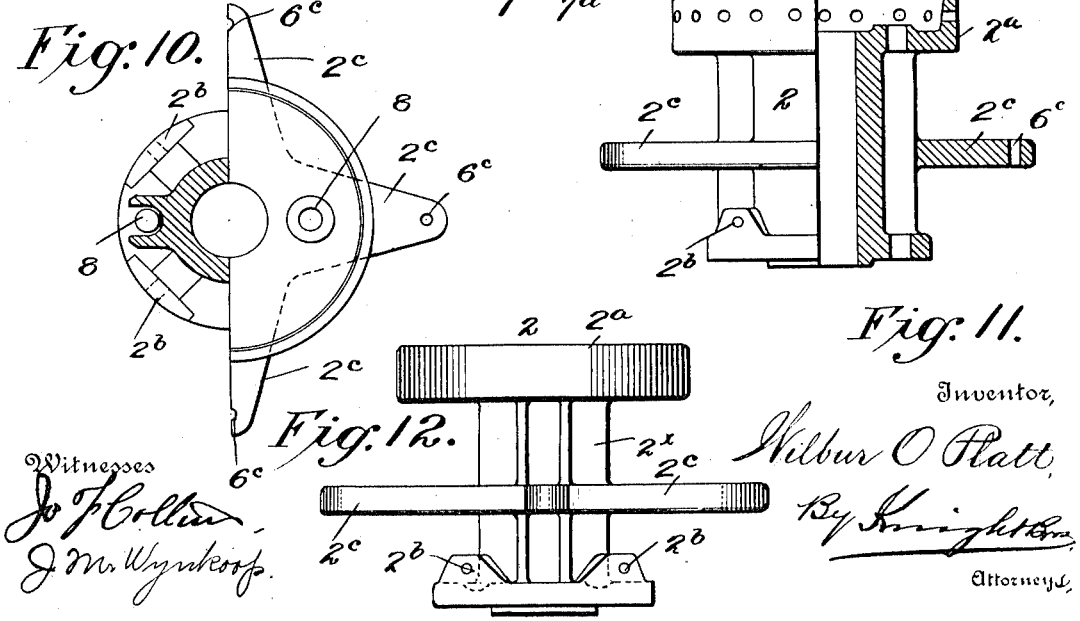

W. O. PLATT.
HORIZONTAL POWER TRANSMISSION WHEEL.
APPLICATION FILED APR. 18, 1911.
1,072,028.
Patented Sept. 2, 1913.
4 SHEETS—SHEET 4.
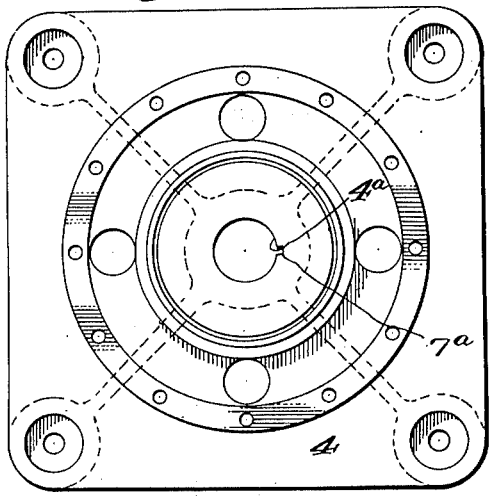
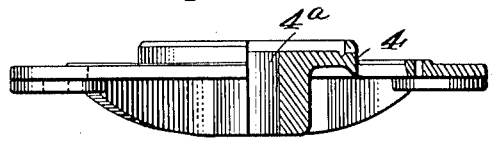
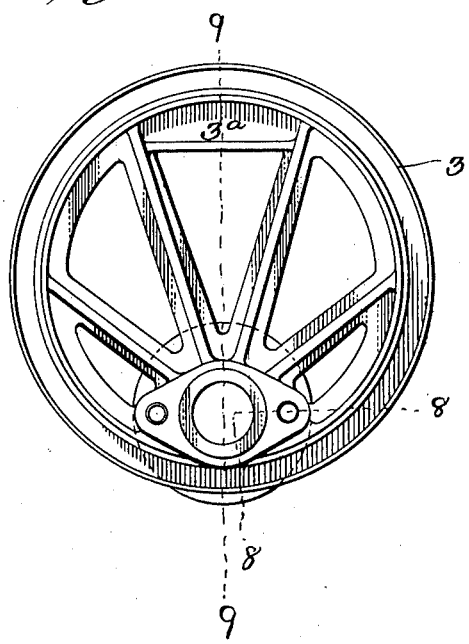
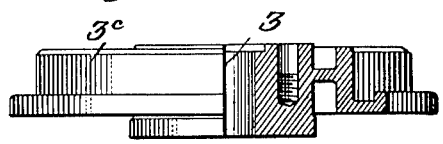
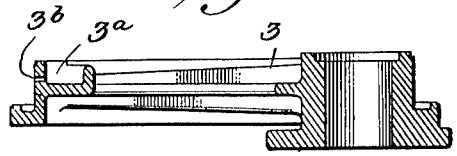

UNITED STATES PATENT OFFICE.

WILBER O. PLATT, OF OIL CITY, PENNSYLVANIA, ASSIGNOR TO JOSEPH REID GAS ENGINE COMPANY, OF OIL CITY, PENNSYLVANIA, A CORPORATION OF PENNSYLVANIA.

HORIZONTAL POWER-TRANSMISSION WHEEL.

1,072,028.           Specification of Letters Patent.        Patented Sept. 2, 1913.

Application filed April 18, 1911. Serial No. 621,951.

*To all whom it may concern:*

Be it known that I, WILBER O. PLATT a citizen of the United States, and a resident of Oil City, in the county of Venango and State of Pennsylvania, and whose post-office address is Oil City, Pennsylvania, have invented certain new and useful Improvements in Horizontal Power-Transmission Wheels, of which the following is a specification.

The invention relates to means for developing, from a single source of power, reciprocating movements in a plurality of connections extending outward in different directions to a corresponding number of well pumps or other apparatus to be actuated; and particularly to that class of such devices which embody a band wheel to be driven from a suitable prime mover, and one or more eccentrics driven by said band wheel, from the ring or rings of which the several transmission connections radiate. The strains imposed upon the band driving wheel in a power of this type are circumferential strains incident to the transmission of the torque, certain distorting strains due to the pressure of the driving band on the wheel, strains in an axial direction incident to the weight of the rim, which lies in a horizontal position, and to some extent centrifugal strains incident to the relatively slow rotation of the wheel. It has heretofore been customary to construct the wheels of these pumping powers, either relatively heavy throughout so as to develop a rigid inflexible structure or to make the rim relatively heavy for rigidity under the several strains imposed upon it and to connect it by a system of tension spokes. It has also been proposed to dispose some of the tension spokes in positions advantageous to resist relative movement between the rim and hub in the direction of torque, though without avoiding the use of a heavy rim necessary to take care of distorting strains resulting from the pressure of the driving band.

One object of my invention is to provide a wheel, which may be made of relatively light structure throughout, while at the same time, adapted to resist all of the strains, which will be imposed upon it in use. To these ends I provide a rim of light construction, which is preferably sustained vertically or in an axial direction, mainly or largely by tension spokes extending from the rim to a hub flange, which is in a plane somewhat above that of the rim, and I sustain the rim radially as well as circumferentially or in the direction of torque, through means of spokes which not only serve as compression members, but have sufficient transverse rigidity to resist movement of the rim relatively to the hub in the direction of torque. These spokes should, however, be of relatively light construction and for this reason, while giving them an essentially - radial position, each spoke is nevertheless in the form of a truss or braced structure, the individual members of which are symmetrically disposed at an angle to the radius passing through the point of attachment of the rim, and taken collectively, with the connecting portions of the hub, provide a triangular structure quite rigid in the plane of the wheel, in spite of the relatively light material of which the radially-disposed truss members are constructed.

The ready separability as well as convenience in assembling are both important in a structure of this kind, owing to the relatively large dimensions which prevent shipping in assembled condition. For these reasons, the rim is divided into a number of parts adapted to be readily connected in the field, and the tension and rigid spokes are likewise easily separable from the rim and hub. Again the hub is separable into two or more parts, preferably in the plane which separates the eccentric from the hub proper, there being, if desired, a plurality of eccentrics to accommodate the necessary number of radiating pumping connections.

The hub sections, including the hub proper and the eccentric members, are adapted to be assembled in such a manner that their bores will coincide and together provide the turning bearing for the wheel, and the means by which they are connected is such that the torque will be readily transmitted from the hub proper to the eccentric or eccentrics associated therewith.

Figure 2:
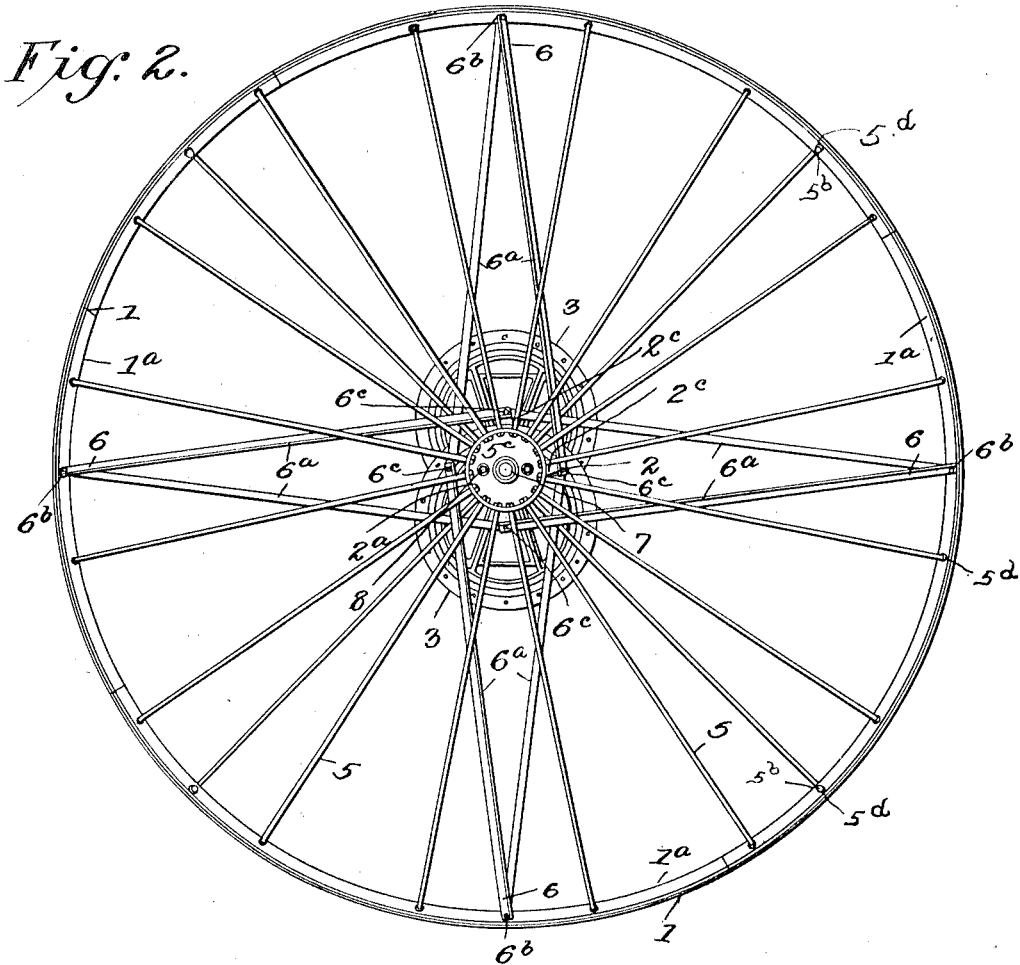
Figure 3:
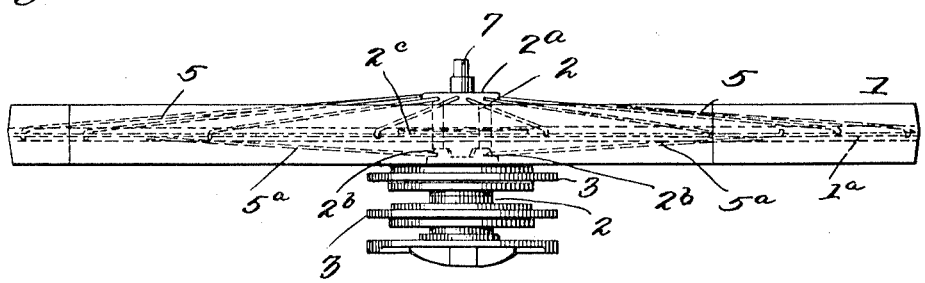

The invention will be fully understood upon reference to the accompanying drawings, in which, Figure 1 is a perspective view of a power constructed in accordance with the several features of my present invention; Fig. 2 is a plan view of the same; Fig. 3 shows the same construction in elevation; Fig. 4 is a vertical section through the hub members and base; Figs. 5 and 6 show the base in plan view and axial section, respectively; Figs. 7, 8 and 9 show one of the eccentrics in plan view, and two axial sections taken respectively on the lines 8—8 and 9—9 of Fig. 7; and Figs. 10, 11 and 12 show the construction of the hub proper; Fig. 10 being in plan, partly in section; Fig. 11 in side elevation (partly in section) as viewed from the right of Fig. 10; and Fig. 12 in sectional elevation as seen in a direction at right angles to Fig. 11.

In Figs. 1 to 3, 1 represents the rim, 2 the hub, 3 the eccentrics and 4 the base of a band wheel power, constructed in accordance with my invention. From a hub flange $2^a$, in a plane above the rim 1, tension spokes 5 extend radially and downwardly to the internal stiffening rib $1^a$ of the rim 1. This rim may be sustained against upward displacement (the tendency toward which is very slight in use) by means of a considerably less number of tension spokes $5^a$, extending from lugs $2^b$ in a plane below the central plane of the rim, radially and upwardly to the rib $1^a$ of the rim.

To sustain the rim of the wheel against crushing or distortion and against movement relatively to the hub in the direction of torque, circumferentially rigid truss spokes 6 are introduced at suitable intervals (four being sufficient) between the hub and rim, the general disposition of which is in the plane of the rim and in true radial position. Each of these spokes consists of a pair of members $6^a$, adapted by their inherent structure and by their method of attachment to serve as both tension and compression members, and disposed in symmetrical angular relation to a true radius of the wheel; the connections $6^b$ of their outer ends to the rim coinciding and the connections $6^c$ of their inner ends to the hub being spaced part to provide the base of an isosceles triangle, the altitude of which is a radius of the wheel.

Diametrically-opposite trussed spokes have their inner connections in common and, as stated, these spokes are preferably four in number, so that each will sustain a quadrant of the wheel. To receive them, the hub is provided with radial arms $2^c$ of sufficient radial length to give proper dimension to the base of the truss and resolve circumferential strains on the rim into tension and compression strains in the spoke members; said base, however, being not sufficient to impair the efficiency of the truss spokes to resist inward radial strains imposed upon them as a whole or to necessitate the use of too heavy material in resisting such strains. The members of the truss spokes are preferably constructed of L-shaped rolled steel, with one web parallel with the middle plane of the wheel to stiffen the spokes in the direction of torque and the other web perpendicular thereto to stiffen the wheel in the direction of its axis. In connecting the ends of the spokes to the rib $1^a$ and the hub arms $2^c$, they are alternated on opposite sides of said rib and arms, with their adjacent webs parallel and their perpendicular webs extending outwardly, so that they avoid interference with one another where they intersect.

To facilitate shipment, the rim is divided at suitable points such as $1^b$, preferably making four divisions or dividing the wheel into quadrants, and the spokes 6 are readily detachable by removing the bolts at $6^b$ and $6^c$, while the tension spokes 5 are readily removed by removing the nuts $5^c$ from their inner ends and then withdrawing the heads $5^b$, at their outer ends, through the enlarged portions of the openings $5^d$ in the rib $1^a$.

As shown in Fig. 4, the hub 2 embodies a section $2^x$, which forms the hub proper, carrying the flange $2^a$, the arms $2^c$ and the lugs $2^b$ (Fig. 10); also one or more eccentric sections $3^x$ fitted co-axially with the section $2^x$, with their bores $2^y$, $3^y$ in sufficiently accurate alinement to adapt them to serve as the rotary bearing for the wheels on the stub axle 7, which projects from the base 4. The hub sections are united by bolts 8, extending upwardly from the bottom eccentric section $3^x$, through the upper end of the column of sections where they receive nuts $8^a$; these bolts and nuts being sufficient to draw the sections into rigid relation and to sustain any strains of torque that may be transmitted from one section to another.

Each eccentric 3 is provided with an oil cup $3^a$, adapted to supply lubricant through ducts $3^b$ to the wearing face $3^c$, which receives the eccentric ring. Beneath the face $3^c$, the eccentric is provided with an oil trough $3^d$, in which the eccentric ring rests and by which oil will be retained and kept within reach of the ring.

The rings 9 are of common construction and need not be specifically described beyond the statement that they are provided with the usual perforations $9^a$ to receive the connecting rods, which radiate to the several places at which the power is to be used.

As best shown in Figs. 4, 5 and 6, the base provides a central step or socket $4^a$ for the stub shaft or spindle 7, which is tightly fitted therein by means of a key $7^a$ and said base is suitably constructed with vertical strengthening ribs and perforations to adapt it to be embedded in and anchored to a suitable foundation of cement or other material. The journal post 7 has a reduced upper end $7^b$ that receives the tie rods 10, which radiate at suitable points where they are connected through jointed sections $10^a$, attached to dead men or other suitable sustaining means $10^b$. The tie rods 10 are held against displacement by means of the cap 7ᶜ which may be conveniently employed for supporting a reservoir 11, which has a slow discharge tube 12 delivering within the flanged upper end of the hub for the purpose of supplying lubricant to the central bearing on the axle 7. The tie rods 10 are provided with turn buckles 10ᵃ for the purpose of changing their length and inasmuch as the eye in the end of each tie rod fits over the reduced upper end of the stationary shaft 7, it follows that any wear in the connection between the rods and the shaft is taken up by the adjustment of the rods so that the shaft may always be held rigidly in central position. This result is not attainable where a bearing piece is fitted over the upper end of the shaft and the rods are connected to the bearing piece, for obviously in such case the enlargement of the opening in the bearing piece by wear leaves the bearing of the shaft loose.

I claim:—

1. A power transmission apparatus having a vertical axis of rotation and comprising a power transmitting member and a relatively large belt driven member connected coaxially with said power transmitting member; said belt driven member comprising an axially elongated hub, a relatively light belt receiving rim, and suspending and driving connections between said hub and rim, trussed vertically and horizontally, respectively; the vertically trussed suspending connections comprising tension spokes extending from the hub above the plane of the rim outwardly and downwardly to the rim, and rigid compression members connecting the rim and hub in the plane of the rim; the horizontally trussed driving connections comprising the said rigid compression members of the suspending trussed connections, and being connected in pairs to the rim and to the hub and having their ends spaced apart at the hub to convert driving strains into strains of compression and tension, respectively, upon the members of each pair.

2. A power transmission apparatus having a vertical axis of rotation and comprising a power transmitting member, and a belt driven member superimposed upon said transmitting member; said belt driven member comprising an axially elongated hub having a suspending flange at its upper end and a driving flange below the suspending flange, a rim, tension rods extending from the suspending flange outwardly and downwardly to the rim, and power transmitting members extending from the driving flange to the rim; said rim having an inwardly presented rib, and said power transmitting members comprising angle bars attached on opposite sides of said rib and of the driving flange of the hub.

The foregoing specification signed at Washington, District of Columbia, this 12th day of December, 1900.

WILBER O. PLATT.

Witnesses:
HERVEY S. KNIGHT,
EDWIN S. CLARKSON.